United States Patent
Imhof

(10) Patent No.: US 8,360,144 B2
(45) Date of Patent: Jan. 29, 2013

(54) METHOD FOR GEOPHYSICAL AND STRATIGRAPHIC INTERPRETATION USING WAVEFORM ANOMALIES

(75) Inventor: Matthias Georg Imhof, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 270 days.

(21) Appl. No.: 12/920,285

(22) PCT Filed: Feb. 26, 2009

(86) PCT No.: PCT/US2009/035311
§ 371 (c)(1),
(2), (4) Date: Aug. 30, 2010

(87) PCT Pub. No.: WO2009/137150
PCT Pub. Date: Nov. 12, 2009

(65) Prior Publication Data
US 2011/0042098 A1 Feb. 24, 2011

Related U.S. Application Data

(60) Provisional application No. 61/127,107, filed on May 9, 2008.

(51) Int. Cl.
*E21B 49/00* (2006.01)
*G01V 1/28* (2006.01)
(52) U.S. Cl. .................. 166/250.01; 166/250.16; 367/38
(58) Field of Classification Search ............. 166/250.01, 166/250.16; 367/38
See application file for complete search history.

(56) References Cited

U.S. PATENT DOCUMENTS

| | | | |
|---|---|---|---|
| 5,724,309 | A | 3/1998 | Higgs et al. |
| 6,208,416 | B1 | 3/2001 | Huntley et al. |
| 6,278,949 | B1 | 8/2001 | Alam |
| 6,487,502 | B1 | 11/2002 | Taner |
| 6,597,994 | B2 | 7/2003 | Meek |
| 6,775,620 | B1 | 8/2004 | Baker, III |
| 6,850,845 | B2 | 2/2005 | Stark |
| 7,024,021 | B2 | 4/2006 | Dunn et al. |
| 2008/0002873 | A1 | 1/2008 | Reeves et al. |

OTHER PUBLICATIONS

Ghiglia, D.C. et al. (1998), "Two-dimensional Phase Unwrapping," *Wiley-Interscience*, pp. 31-50.
Fehmers, G.C. et al. (2003) "Fast structural interpretation with structure-oriented filtering," *Geophysics* 68(4), pp. 1286-1293.
Hardage, B.A., et al. (1998), "3-D instantaneous frequency used as a coherency/continuity parameter to interpret reservoir compartment boundaries across an area of complex turbidite deposition," *Geophysics*, 63(5), pp. 1520-1531.

(Continued)

*Primary Examiner* — Giovanna Wright
(74) *Attorney, Agent, or Firm* — ExxonMobil Upstream Research Comapny Law Dept.

(57) ABSTRACT

A new seismic attribute is disclosed along with its use to locate and classify seismic waveform anomalies and use them to construct objects and from them geologic surfaces (77) and bodies (75) from which hydrocarbon potential (or quality control of the seismic acquisition and processing (71)) may be assessed (79). The seismic attribute is constructed (74) from determinations of phase residues in the seismic data volume (72), preferably using complex trace analysis but alternatively by comparing neighboring waveforms for disappearing waveshape inflections. It is shown that in a data volume of the new attribute, non-zero values form strings and loops that may be associated with objects (geobodies) or surfaces such as unconformities or flooding surfaces. Methods of classification and selection (76) to reduce the number of objects generated are provided.

21 Claims, 9 Drawing Sheets

OTHER PUBLICATIONS

Hu, M.K. (1962), "Visual pattern recognition by moment invariants," *IRE Transactions on Information Theory*, IT-8, pp. 179-187.

Huntley, J.M. (2001), "Three-dimensional noise-immune phase unwrapping algorithm," *Applied Optics*, 40(23), pp. 3901-3908.

Luo, Y., et al. (1996), "Edge detection and stratigraphic analysis using 3-D seismic data," 66th Annual International Meeting, Society of Exploration Geophysicists, pp. 324-327.

Partyka, G.J. (1999), "Interpretational applications of spectral decomposition in reservoir characterization," *The Leading Edge* 18(3), pp. 353-360.

Pinkall et al. (1993), "Computing Discrete Minimal Surfaces and Their Conjugates", *Experimental Mathenatics* 2, pp. 15-36.

Robertson, J.D. et al. (1984), "Complex seismic trace analysis of thin beds," *Geophysics* 49(4), pp. 344-352, 1984.

Rosenfeld, A., et al. (1966), "Sequential operations in digital image processing," *Journal of the Association for Computing Machinery* 13, pp. 471-494.

Sheriff, R.E. et al. (1995) , "Exploration Seismology," Cambridge University Press, pp. 371-385, 401-412.

Taner, M.T. et al. (1979), "Complex seismic trace analysis," *Geophysics* 44(6), pp. 1041-1063.

White, R.E. (1984), "Signal and noise estimation from seismic reflection data using spectral coherence methods," *Proceedings of the IEEE* 72, pp. 1340-1356.

White, R.E. (1991), "Properties of instantaneous attributes," *The Leading Edge* 10(7), pp. 344-352.

*International Search Report and Written Opinion*, dated Jul. 17, 2009, PCT/US2009/035311.

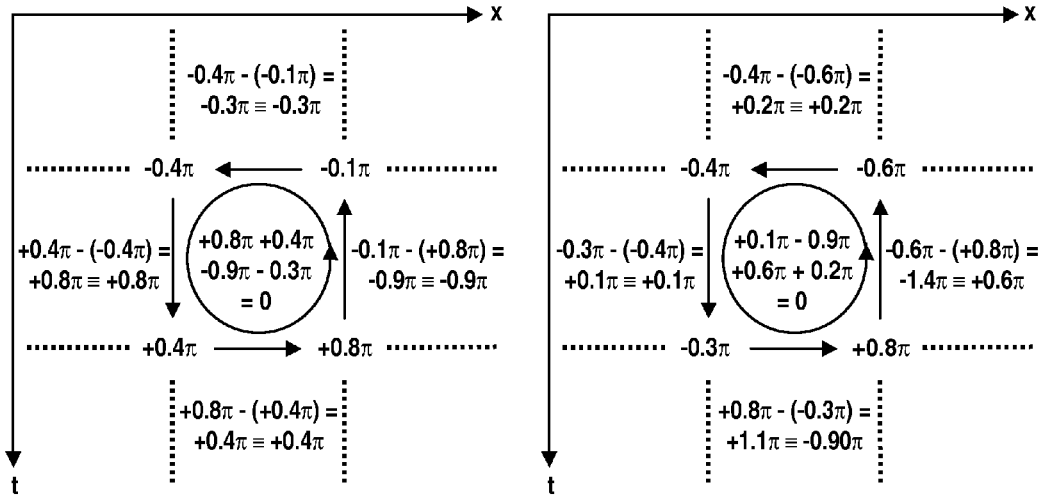
*FIG. 8A*  *FIG. 8B*
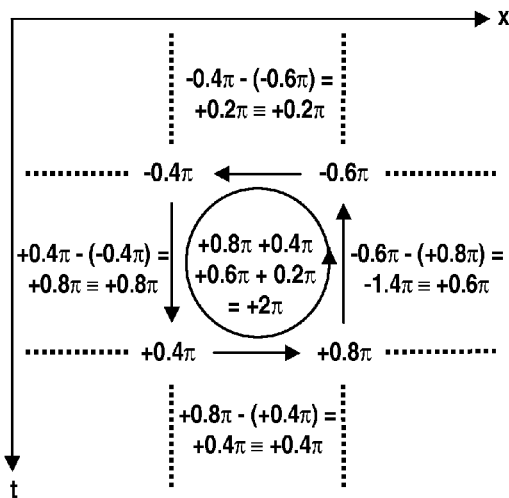
*FIG. 9*

METHOD FOR GEOPHYSICAL AND STRATIGRAPHIC INTERPRETATION USING WAVEFORM ANOMALIES

CROSS-REFERENCE TO RELATED APPLICATION

This application is the National Stage entry under 35 U.S.C. 371 of PCT/US2009/035311 that published as WO 2009/137150 and was filed on 26 Feb. 2009, which claims the benefit of U.S. Provisional Application No. 61/127,107, filed on 9 May 2008, each of which is incorporated by reference, in its entirety, for all purposes.

FIELD OF THE INVENTION

This invention relates generally to the field of geophysical prospecting, and more particularly to seismic data processing and interpretation. Specifically, the invention is a method to locate and classify seismic waveform anomalies and use them to construct geologic surfaces and bodies.

BACKGROUND OF THE INVENTION

In order to search for hydrocarbon accumulations in the earth, geoscientists are using methods of remote sensing to look below the earth's surface. A routinely used technique is the seismic reflection method where man-made sound waves are generated near the surface. The sound propagates into the earth, and whenever the sound passes from one rock layer into another, a small portion of the sound is reflected back to the surface where it is recorded. Typically, hundreds to thousands recording instruments are employed. Sound waves are sequentially excited at many different locations. From all these recordings, a two- or three-dimensional image of the subsurface can be obtained after significant data processing. Measurements derived from these data are called seismic attributes.

The most commonly used attribute is amplitude of the recorded sound waves because it allows identification and interpretation of many subsurface features such as the boundaries between different rock layers. Many other properties of the subsurface, however, are not sufficiently identifiable on images of basic seismic amplitude. The published literature describes numerous manipulations of seismic data, and thus, numerous attributes that each highlight some specific feature, relationship, or pattern that might otherwise be difficult to detect.

Taner et al. developed complex trace analysis of seismic data and defined two seismic attributes, instantaneous phase and frequency. ("Complex seismic trace analysis," *Geophysics* 44, 1041-1063 (1979)) In U.S. Pat. No. 6,487,502, Taner presented a method based on instantaneous phase and frequency to estimate the shaliness of the subsurface.

In U.S. Pat. No. 5,724,309, Higgs and Luo presented a method for utilizing instantaneous phase and its derivatives as display and/or plot attributes for seismic reflection data processing and interpretation for two-dimensional and three-dimensional seismic data. Specifically, they compute the spatial frequency, dip magnitude and dip azimuth attributes of the seismic events using the rate of change of instantaneous phase with space, instantaneous frequency and seismic velocity. The results are displayed or plotted to assist interpreters in identifying fault breaks and stratigraphic features in the earth's subsurface. See also Luo et al., "Edge detection and stratigraphic analysis using 3-D seismic data," 66th Annual International Meeting, Society of Exploration Geophysicists, 324-327 (1996).

In *Two-dimensional Phase Unwrapping*, Wiley-Interscience, pages 31-50 (1998), Ghiglia and Pritt present a two-dimensional method for the computation of phase residues in the context of phase unwrapping. When unwrapping the phase along a closed path, the final value equals the initial one unless the path encloses a phase residue. Making this path infinitesimal allows location and definition of discrete points termed phase residues where such inconsistencies arise. Due to the two-dimensionality, however, most residues are isolated and thus, do not line up in a systematic manner.

Huntley presents a three-dimensional extension of the phase residues in "Three-dimensional noise-immune phase unwrapping algorithm," *Applied Optics* 40, 3901-3908 (2001). He demonstrates that in three dimensions, phase residues line up systematically in the shape of closed loops or open strings. He uses these loops to construct simple surfaces that disambiguate the inconsistencies arising in phase unwrapping. He then uses the resulting three-dimensional phase unwrapping algorithm as the basis for a method and apparatus for measuring the shape of objects from the projected fringes generated by optical interferometry. Huntley discloses the generation of phase residues and their conversion to simple surfaces (by interpolation) for the purpose of phase unwrapping. No further meaning or usage for phase residues is disclosed.

U.S. Pat. No. 6,850,845 to Stark presents a method to convert instantaneous phase into a monotonically increasing unwrapped phase and uses these values to ease seismic interpretation by removing structural complexity.

U.S. Pat. No. 6,278,949 to Alam presents a method for visualization of a seismic data volume that automatically highlights geologic structure and compartments without requiring manual picking.

U.S. Pat. No. 6,775,620 to Baker and U.S. Pat. No. 7,024,021 to Dunn and Czernuszenko present other methods to locate a surface in a three dimensional volume of seismic data based on automatic generation of horizons from interactively selected points.

SUMMARY OF THE INVENTION

In one embodiment, the invention is a method for geophysical or stratigraphic interpretation of a subsurface region, comprising:

(a) obtaining a volume of seismic data representative of the subsurface region, said seismic data comprising traces having amplitude and phase as a function of recording time;

(b) computing a data volume of values of a wavelet-split attribute from the seismic data volume, a data "volume" being a discrete set of data samples wherein the subsurface region is subdivided into discrete cells, each cell having a single value of a data parameter, wherein a wavelet-split attribute is any seismic data attribute that indicates data volume cells where one seismic waveform is about to split into two separately distinguishable ones;

(c) generating one or more objects (geobodies) from the wavelet-split attribute data volume; and (d) using the one or more objects to interpret structure or stratigraphy of the subsurface region or for quality control on seismic acquisition and processing.

The wavelet-split objects are typically connected strings or loops of non-zero values of the wavelet split attribute. The interpreted structure or stratigraphy of the subsurface region or quality-controlled seismic acquisition and processing are useful in prospecting for hydrocarbon accumulations.

BRIEF DESCRIPTION OF THE DRAWINGS

The present invention and its advantages will be better understood by referring to the following detailed description and the attached drawings in which:

FIGS. 8A-B show two examples of closed paths over two by two samples of instantaneous phase, neither of which exhibits a phase residue when summing up the difference between sample values;

FIG. 9 shows a closed path over two by two samples of instantaneous phase that exhibits a phase residue when summing up the difference between sample values after correcting the phase difference terms with multiples of $2\pi$ to force them into the range between $-\pi$ and $+\pi$;

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS OF THE INVENTION

The present invention is a new a seismic attribute with applications including but not limited to quality control and data processing, structural and stratigraphic interpretation, or subsurface property prediction. The present invention is also a method of prospecting for hydrocarbon accumulations making use of the new attribute.

The new seismic attribute flags the locations in a seismic data volume where one seismic reflection splits into two separate ones. Such wavelet splitting occurs, for example, as a result of noise, acquisition and processing artifacts, faults, stratigraphic pinch outs, stratigraphic unconformities, discontinuities, or variations in layer thickness, lithology, or pore fluid. Wavelet splitting indicates potentially important anomalies that may require further manual or automatic investigation. The different causes yield characteristic spatial patterns of these locations that allow their differentiation and (automatic) recognition. Many surfaces with geologic relevance relate to these causes, and thus, the locations of splitting wavelets provide a starting point for manual or automatic placement of geologically significant surfaces.

In principle, the present inventive method measures whether a count of seismic cycles is consistent along a closed path. An inconsistency indicates that the number of seismic cycles or reflections is locally changing which could be the result of noise, acquisition and processing artifacts, faults, stratigraphic pinch outs, stratigraphic unconformities, discontinuities, or variations in layer thickness, lithology, or pore fluid.

Figure 2:
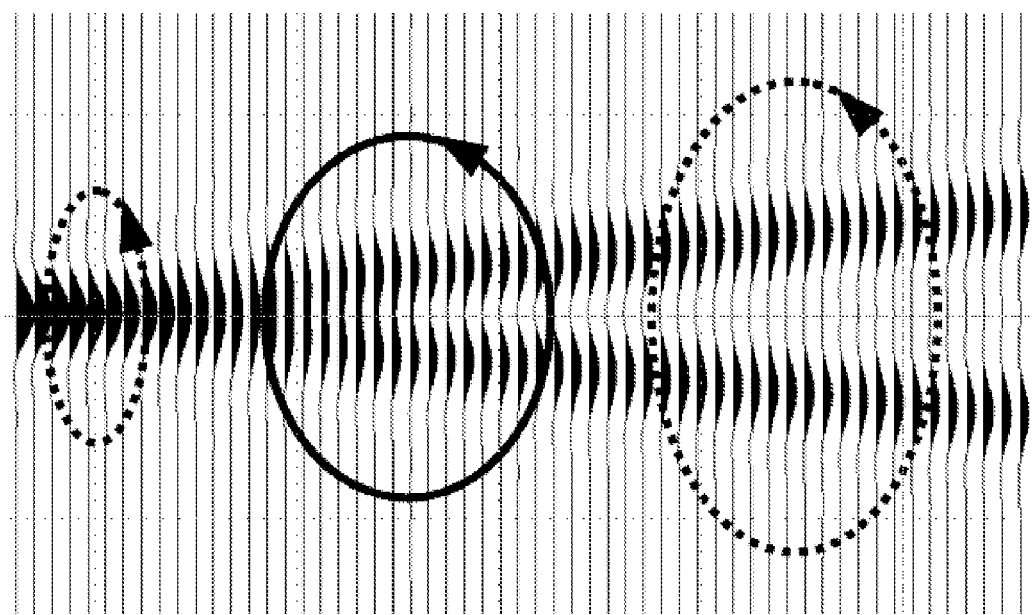
FIG. 2 illustrates counting cycles along closed paths, wherein the paths on the left and right exhibit a consistent count between the up and down legs of the path, but the one in the middle exhibits an anomalous cycle count.

For the seismic wedge in FIG. 2, the closed path on the left encounters one cycle on both the up- and downward legs of the path. The closed path on the right encounters two cycles per leg. The path in the middle, however, encounters one cycle on one side, but two on the other and thus exhibits a cycle inconsistency that indicates a geophysical or geologic anomaly that warrants further investigation. In reality, actually counting cycles is rather impractical. Another point of view is that the inconsistency is caused by the split of the seismic wavelet.

Figure 3:
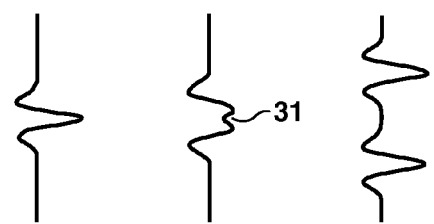
FIG. 3 shows that the onset of a wavelet split is characterized by the development of an inflection of the wavelet shape marked by the arrow; the only place where an instantaneous phase residual will exist is at this inflection point.

FIG. 3 shows that the wavelet split begins with the development of an inflection in the wavelet shape at 31. Thus, recognition of the onset of a wavelet-shape inflection can serve as an alternative to the detection of an inconsistency of the cycle count. The property of whether the seismic wavelet exhibits an inflection at a given point is termed herein the wavelet-split attribute. This attribute is almost everywhere zero. Only at locations with an inflection is it nonzero.

Figure 4:
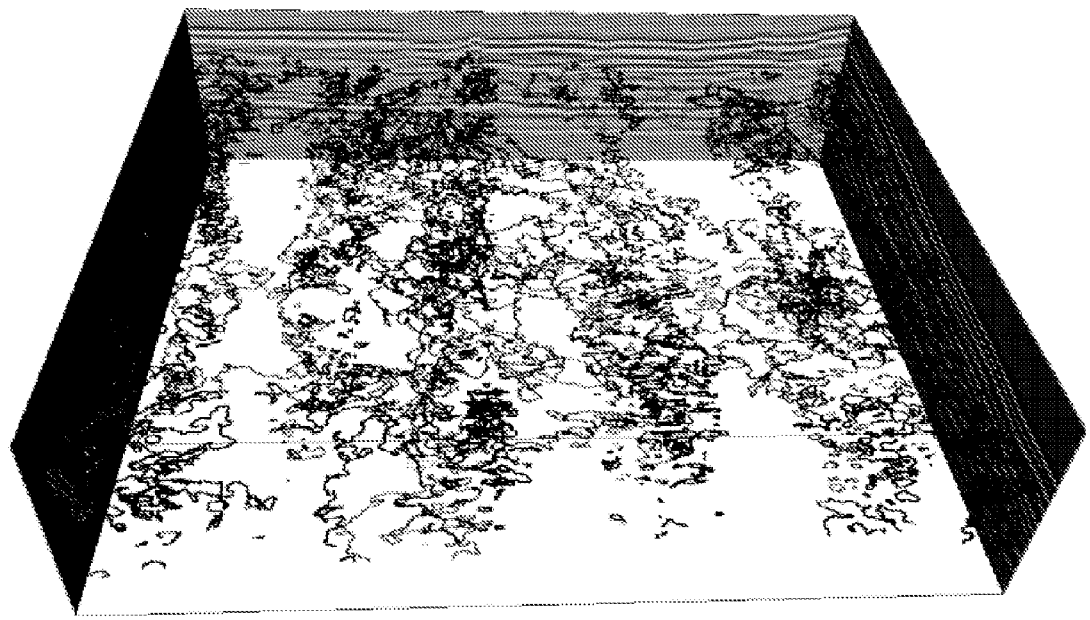
FIG. 4 illustrates that wavelet splits form either loops or strings.

FIG. 4 demonstrates that nonzero values for this attribute are relatively rare, but highly correlated if they exist. Nonzero values rarely exist in isolation, but rather align along closed paths or loops. Other than a single voxel phase residue loop, the only exceptions are paths that intersect the boundaries of the examined data volume and thus resemble strings. These strings and loops can be automatically detected, converted to objects or geobodies, and classified and characterized based on their properties for subsequent usage and interpretation. All wavelet-split attributes that belong to the same path can be gathered into one set defining an object or geobody.

Figure 5A:
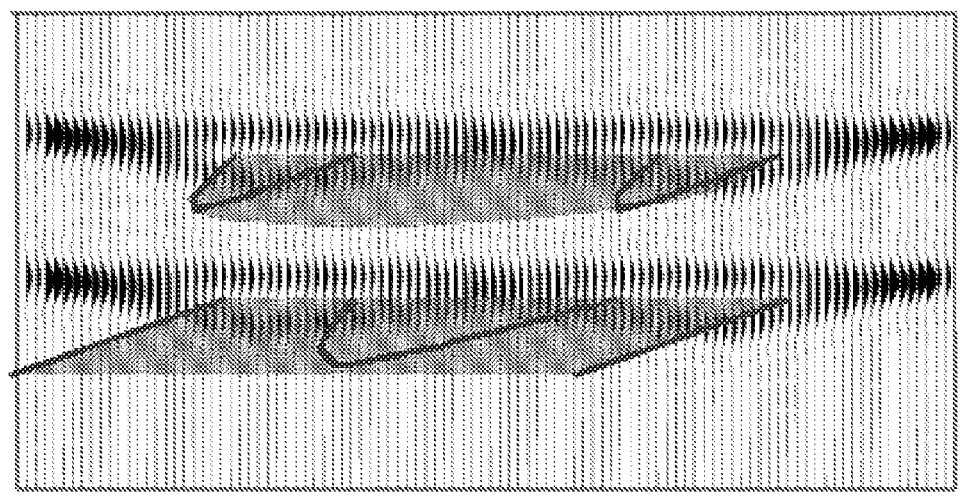
FIGS. 5A-B show that stratigraphic surfaces may be constructed from selected string or loop objects (lines)
Figure 5B:
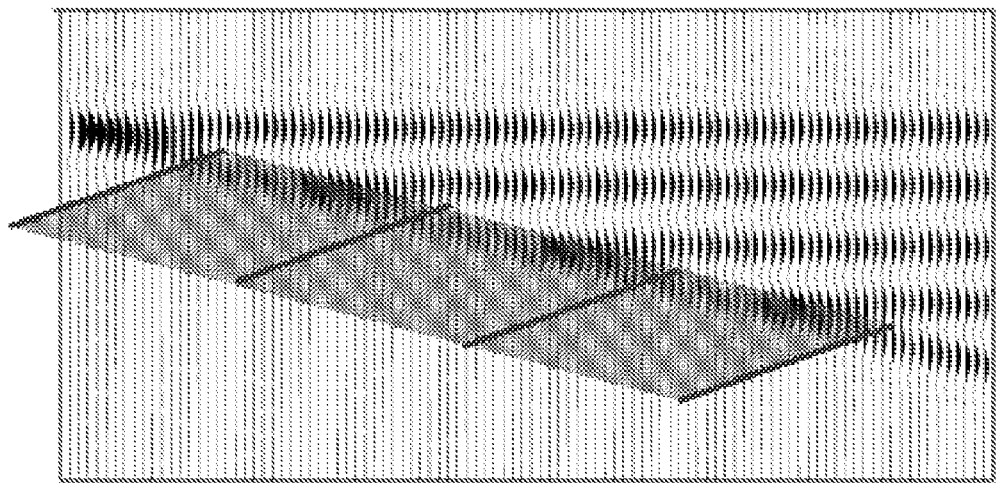

One of the objectives of seismic interpretation is the delineation and mapping of surfaces with stratigraphic relevance. Such surfaces include faults, unconformities, and flooding surfaces. Faults may juxtapose different reflectors which may require a transition of the seismic wavelet from one side to the other generating an inflection on the wavelet, and thus, loops and strings. Along unconformities, reflectors may onlap, offlap, or downlap which causes wavelet transitions with associated loops and strings. Other stratigraphic surfaces show on seismic volumes as two reflectors that merge and split multiple times, and thus, generate loop or string objects. All these surfaces are either bounded by one or multiple anomalous objects or pass through one or more such objects. Thus, some surfaces with stratigraphic relevance can be constructed by interpolation or extrapolation from selected objects (flooding surfaces in FIG. 5A, unconformity in FIG. 5B). In FIG. 5A, two stratigraphic surfaces, corresponding for examples to flooding surfaces or condensed sections, are defined by the lateral convergence and divergence of two reflectors. In FIG. 5B, the resulting onlap surface may correspond to a stratigraphic unconformity.

Figure 6:
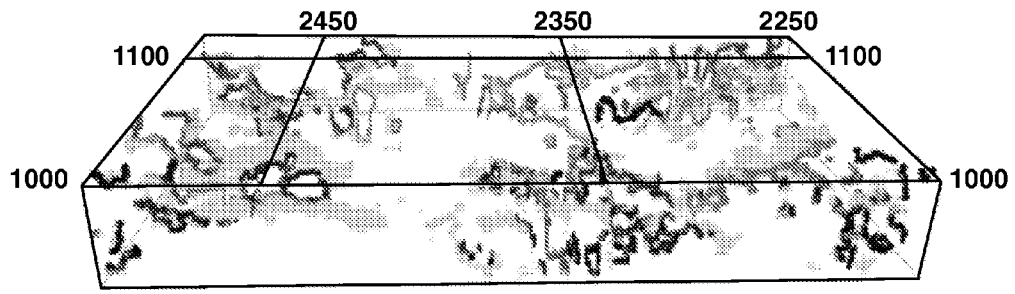
FIG. 6 illustrates pieces of stratigraphically relevant surfaces (lighter shading) created by extending wavelet split objects along instantaneous frequency anomalies.

Robertson and Nogami ("Complex seismic trace analysis of thin beds," *Geophysics* 49, 344-352 (1984)) and White ("Properties of instantaneous attributes," *The Leading Edge*, 10, 344-352 (1991)) demonstrate that the negative instantaneous phase derivatives relate to the wavelet separation with the onset of these negative values occurring at the inflection point. Hardage et al. ("3-D instantaneous frequency used as a coherency/continuity parameter to interpret reservoir compartment boundaries across an area of complex turbidite deposition," *Geophysics* 63, 1520-1531 (1998)) report using such negative values to highlight stratigraphically-relevant surfaces. FIG. 6 shows that negative instantaneous phase derivatives indeed create pieces of surfaces (lighter shading) that rim some loops and strings.

Figure 7:
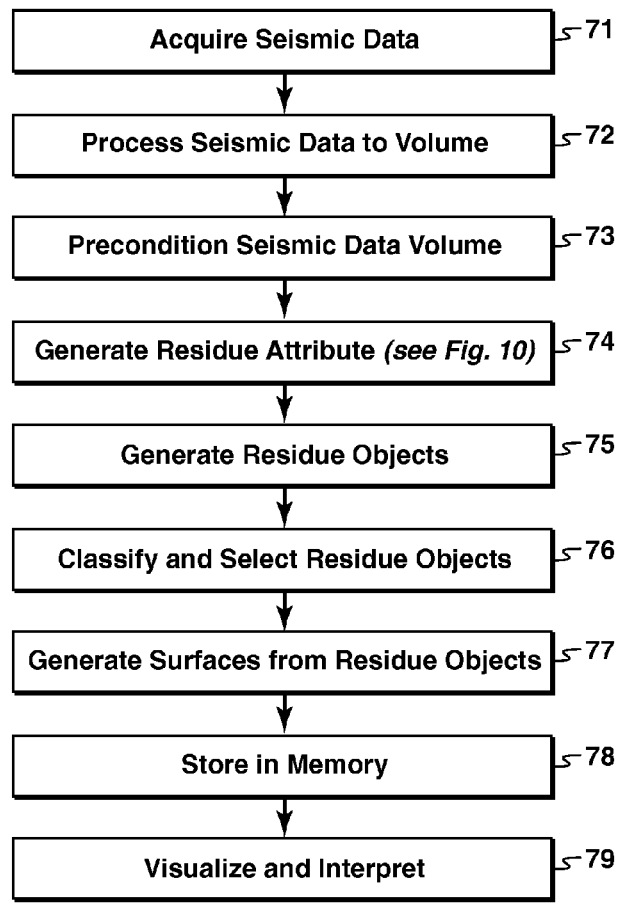
FIG. 7 is a flow chart showing basic steps in one embodiment of the present inventive method.

FIG. 7 is a flow chart showing basic steps in one embodiment of the present invention. Step 71 is acquisition of seismic data; step 72 is processing of the data to three-dimensional volume representing the subsurface; step 73 is preconditioning this volume for application of the novel steps; step 74 is generation of wavelet-split attributes; step 75 is conversion of the attribute to discrete objects; step 76 is classification and selection of the objects to be included in subsequent analysis and interpretation; step 77 is conversion of objects to surfaces; step 78 is storage of attributes, objects, and surfaces in memory; and step 79 is visualization and interpretation.

In more detail, step 71 is acquisition of seismic data where sound waves are generated using an artificial sound source such as a vibrator unit, dynamite shot or an air gun. On land, the sound waves travel into the earth, pass through the various rock layers where they are partially reflected and return back the surface. In the marine case, the sounds waves may also travel through the water column on either leg of their journey. The sound waves are recorded with geophones or seismometers on the surface of the earth or on the seafloor, or with hydrophones towed behind a marine seismic vessel. For a typical seismic survey, data will be recorded for thousands to millions of different combinations of source and receiver locations which may result in the collection of many terabytes of data.

Step 72 is processing of all these data to suppress noise, enhance signal and migrate seismic events to the appropriate location in space, all steps that are well known to persons who process seismic data. The result is a volume with a greatly reduced amount of data, which represents the structure of the subsurface and the geometries of its rock layers (e.g., see FIG. 1). Processing steps typically include analysis of sound velocities and frequencies, static corrections, deconvolution, normal moveout, dip moveout, stacking, and migration, which can be performed before or after stacking.

Step 73 is preconditioning of the seismic data volume in preparation for the generation of the wavelet-split attribute. Preconditioning is an optional step that may encompass noise removal techniques such as the application of a bandpass filter, a coherence filter, a structure oriented filter, or a convolutional operator.

Step 74 is generation of the new attribute of the present invention by detection of the onset of wavelet splitting as defined in FIG. 3. For a very thin rock layer, the reflections from the top and the bottom interfere to form just one wavelet without indication of the presence of the thin layer. For a thick rock layer, the reflections from the top and the bottom are well separated and are readily recognized to be different wavelets. If the layer transitions from very thin to thick, and thus, the reflection transitions from one wavelet to two, there will be a point where the wavelet begins to separate. At this point, the wavelet will exhibit an inflection. With increasing thickness, the inflection will increase until the wavelets have completely separated.

Step 75 is conversion of wavelet-split attributes to wavelet-split objects. The wavelet-split attribute is a data volume indicating the presence or absence of a wavelet split at each location covered by the volume. In three dimensions, many wavelet splits do not exist in isolation, but align along paths forming closed loops or open strings. Instead of just treating each wavelet split as an individual feature, a set of wavelet splits aligned along a common path is combined into a discrete string- or loop-based object or geobody to which a unique label is given. Each wavelet split belongs at most to one such object.

Step 76 is classification and selection or suppression of wavelet-split objects. This is an optional step. Typically, there will be many distinct objects. Trivially, all objects will be used. For a particular application, however, not all objects may be relevant. Objects consisting of only few wavelet splits might be noise which may or may not be relevant to the current application. Each object may thus be classified based on its properties and its relations to other objects and data. Based on this classification, an object may either selected and retained for the remaining steps, or may be suppressed or deleted.

Step 77 is construction of surfaces from the objects. As shown in FIG. 6, the wavelet-split objects may relate to surfaces either by embodying a spine or comprising a rim. A set of objects may thus be aggregated into a geologically relevant surface that may or may not be detectable in seismic data.

Step 78 is storage of the wavelet-split objects and surfaces in computer memory for further analysis and/or interpretation.

Step 79 is visualization and interpretation of wavelet-split objects, surfaces, and other data for quality control of acquisition and data processing, the characterization of the subsurface, or the delineation of underground features relevant to the exploration and production of hydrocarbons.

Construction of Wavelet-Split Attributes from Phase Residues obtained from Complex Trace Analysis In a preferred embodiment of the present invention, wavelet-split attributes are computed (step 74) from complex valued traces obtained by complex trace analysis of the seismic data. In complex trace analysis, for every piece of the trace (or processed recording), one seeks the amplitude, frequency and phase-shift of a monochromatic (or harmonic) signal that locally approximates the trace best. Even a small shift of the location for this analysis within one trace will typically yield different values. One practical way to perform this analysis efficiently is by use of the Hilbert transformation which creates a seismic trace with the same amplitude spectrum, but a phase spectrum that is rotated by 90°. See, for example, Sheriff and Geldart, *Exploration Seismology*, $2^{nd}$ ed., Cambridge University Press, pages 543-544 (1995). Formally, these two mathematically real-valued related traces can be combined into one mathematically complex-valued trace by using the original trace for the real part and the computed one for the imaginary part of the complex trace, and thus the name, complex trace analysis.

The phase shift $\phi(t)$ needed for a monochromatic signal, i.e., a signal containing only one frequency, to locally approximate the original trace p(t) can be computed from the complex trace $c(t)=p(t)+i \cdot q(t)=A(t)e^{i\phi(t)}$, where $i=\sqrt{-1}$ denotes the imaginary unit and q(t) denotes the results of applying the Hilbert transform to p(t). The phase shift is then defined by $\phi(t)=\arctan q(t)/p(t)$. Note that the values of the phase shift are limited to the range between $-\pi$ and $+\pi$ even if the signs of p(t) and q(t) are taken into account.

When used as seismic attributes, A(t) and $\phi(t)$ are termed instantaneous amplitude and instantaneous phase (Taner et al., 1979) and can be interpreted as amplitude and phase of the local monochromatic approximation to the trace. For completeness, instantaneous frequency $f(t)=\partial \phi(t)/\partial t$ at is the derivative of the instantaneous phase and can be interpreted as the frequency of the local monochromatic approximation.

By definition, the instantaneous phase attribute is limited to the range of $-\pi$ and $+\pi$. Upon approaching a value of $+\pi$, it wraps around and continues from a value of $-\pi$ (and vice versa). These jumps can be removed by addition of integer multiples of $2\pi$ (Ghiglia and Pritt, 1998; Huntley, 2001). This correction is justified because unaliased data cannot have instantaneous phase differences with a magnitude exceeding $+\pi$. The consistency of the instantaneous phase values along a closed path may thus be checked by comparing consecutive phase values along the path adding or subtracting integer multiples of $2\pi$ as needed to prevent jumps. If the instantaneous phases along this path are consistent, then the tour will terminate with the original value. If the tour along this closed path ends with a different value than the starting one, the instantaneous phases along this path are inconsistent and the path encircles a phase residue. See the previously cited papers by Ghiglia and Pritt (1998) and Huntley (2001).

On a regular grid such as provided by a seismic data volume, the shortest possible paths are simply small squares consisting of two by two points. As a further simplification, one may simply sum up the differences between two consecutive points where the individual differences are corrected by addition or subtraction of $2\pi$ if their magnitudes exceed $+\pi$. If the instantaneous phases are consistent, then their (corrected) differences will cancel and sum to zero.

In the example shown in FIG. 8A, instantaneous phase values are given along a minimal path of two by two points. All instantaneous phase differences between neighboring samples are with the range between $-\pi$ and $+\pi$. The differences sum up to zero, the instantaneous phase values are consistent, and thus, no phase residue exists. In the example of FIG. 8B, the magnitudes for two differences exceed $+\pi$. Upon addition or subtraction of $2\pi$, however, the differences sum again up to zero indicating consistency without phase residue.

In the example in FIG. 9, one difference term exceeds the range between $-\pi$ and $+\pi$ and is thus corrected by addition of $2\pi$. After this correction, all phase-difference magnitudes are less than $+\pi$, but their sum is not zero anymore, instead, it is now $2\pi$. Thus, these four neighboring samples exhibit an instantaneous phase residue.

Figure 10:
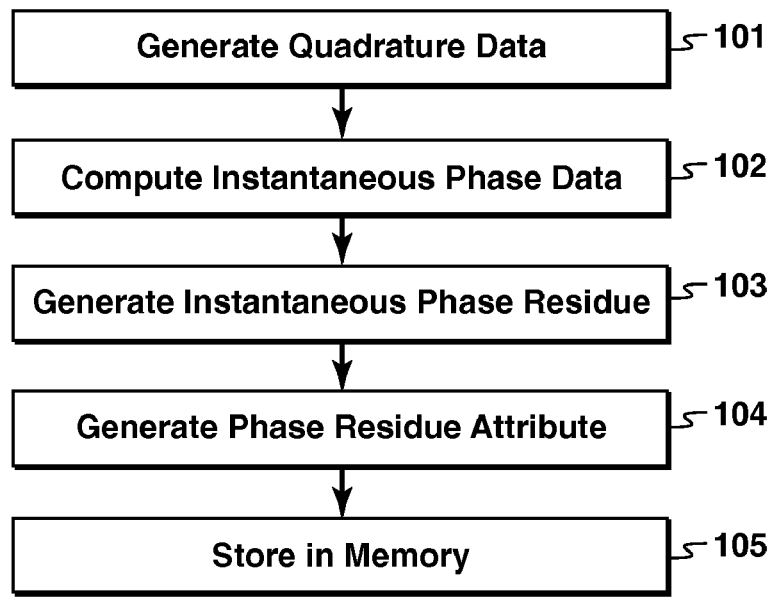
FIG. 10 is a flow chart showing basic steps in generating the phase residue attribute (step 74 of FIG. 7) of the present invention in an embodiment of the invention that uses complex trace analysis to compute wavelet split attributes.
Figure 11:
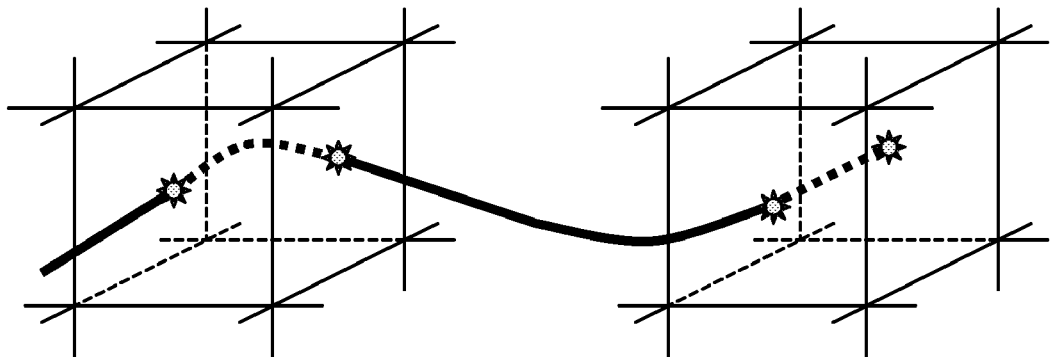
FIG. 11 illustrates that property of wavelet splits whereby in three dimensions, wavelet splits (indicated by the ⌑ symbols) do not occur in isolation but rather along extended paths, which either return to their origin forming a closed loop or intersect the edges of the data volume forming an open string.

The flow chart of FIG. 10 shows basic steps for performing step 74 in one embodiment of the present invention, in which phase residues are computed based on complex trace analysis. Step 101 is generating of the quadrature volume q(t,x,y) by application of a 90° phase rotation to the preconditioned (if preconditioning is performed) data volume p(t,x,y) where the indices (t,x,y) are integer indices describing the time (or depth) and spatial position of the different seismic data samples contained in the seismic data volume. (In seismic data analysis, travel time of the acoustic waves is a surrogate for the vertical or depth dimension z.) One possible manner to generate the quadrature data is by application of the Hilbert transformation, for example by use of a convolutional operator in the time domain or by a change of the phase spectrum in the frequency domain.

At step 102, the instantaneous phase is computed, with instantaneous phase defined as $\phi(t,x,y)=\arctan q(t,x,y)/p(t,x,y)$ which is limited to the range between $-\pi$ and $+\pi$ even when taking the signs into account.

Step 103 is the computation of the instantaneous phase residues for each of the three directions, or at least one of them, at every point of the data volume. The phase residue oriented in the t-direction is defined as (Ghiglia and Pritt, 1998; Huntley, 2001).

$$s_t(t,x,y)=[\phi(t,x+1,y)-\phi(t,x,y)+2\pi n_1]+[\phi(t,x+1,y+1)-\phi(t,x+1,y)+2\pi n_2]+[\phi(t,x,y+1)-\phi(t,x+1,y+1)+2\pi n_3]+[\phi(t,x,y)-\phi(t,x,y+1)+2\pi n_4]$$

where the coefficients $n_1$, $n_2$, $n_3$, $n_4$ are chosen to be +1, 0, or −1 such that the magnitude of each contribution term is minimal. Similarly, instantaneous phase residues oriented in the x- and y-directions are computed by $$s_x(t,x,y)=[\phi(t+1,x,y)-\phi(t,x,y)+2\pi m_1]+[\phi(t+1,x,y+1)-\phi(t+1,x,y)+2\pi m_2]+[\phi(t,x,y+1)-\phi(t+1,x,y+1)+2\pi m_3]+[\phi(t,x,y)-\phi(t,x,y+1)+2\pi m_4]$$

$$s_y(t,x,y)=[\phi(t+1,x,y)-\phi(t,x,y)+2\pi k_1]+[\phi(t+1,x+1,y)-\phi(t+1,x,y)+2\pi k_2]+[\phi(t,x+1,y)-\phi(t+1,x+1,y)+2\pi k_3]+[\phi(t,x,y)-\phi(t,x+1,y)+2\pi k_4]$$

where again the coefficients $k_1$, $k_2$, $k_3$, $k_4$ and $m_1$, $m_2$, $m_3$, $m_4$ are chosen to be +1, 0, or −1 such that the magnitude of each contribution term is minimal.

At step 104, the present invention's wavelet-split attribute s(t,x,y) is computed. Each of the three components $s_t(t,x,y)$, $s_x(t,x,y)$ and $s_y(t,x,y)$, the magnitudes of these components, or any one of them or a linear combination thereof, could serve as a wavelet-split attribute s(t,x,y) in different embodiments of the present invention. The reason for using the absolute contributions is that signed contributions could have opposing signs and cancel each other in a summation. Although the simple sum $s(t,x,y)=|s_t(t,x,y)|+|s_x(t,x,y)|+|s_y(t,x,y)|$ with contributions from only current point (t,x,y) could be used and is used in one embodiment of the invention, it is preferable to include contributions from some of the surrounding points to maximize attribute connectivity. Thus, in a particular embodiment of the invention, the new wavelet-split attribute is defined as:

$$s(t,x,y)=|s_t(t,x,y)|+|s_t(t+1,x,y)|+|s_x(t,x,y)|+|s_x(t,x+1,y)|+|s_y(t,x,y)|+|s_y(t,x,y+1)|.$$

The wavelet-split attributes may be stored in computer memory for further analysis and/or interpretation to further the end of prospecting for hydrocarbons (step 105).

An alternative to the method of FIG. 10 avoids the addition and subtraction of the $2\pi$ terms and thus the minimization of the contributing terms. This alternative is based on the definition of instantaneous phase $\phi(t,x,y)=\arctan q(t,x,y)/p(t,x,y)$. The instantaneous phase residue $s_t(t,x,y)$ in the t-direction may be computed as $s_t(t,x,y)=\partial_{xy}$ arctan $(q(t,x,y)/p(t,x,y))$, where $\partial_{xy}$ means $(\partial/\partial x)(\partial/\partial y)$.

Omitting the arguments (t,x,y) for the sake of simplicity, this derivative can be expressed as $s_t=\partial_{xy}$ arctan $(q/p)=N_t/D$ where $$N_t=q^2(\partial_x q\cdot\partial_y p+\partial_y q\cdot\partial_x p-q\partial_{xy}p)-p^2(\partial_x q\cdot\partial_y p+\partial_y q\cdot\partial_x p+q\partial_{xy}p)+pq(2\partial_x p\cdot\partial_y p-2\partial_x q\cdot\partial_y q+q\cdot\partial_{xy}q)+p^3\partial_{xy}q$$

$$D=(p^2+q^2)^2$$

For the other directions, the relations are analogous. In practice, the derivatives might be taken by numerical approximation using finite-difference computations.

Thus, in this alternative approach, the first step is the same as 101 in FIG. 10: generation of the quadrature volume q(t,x,y) from the preconditioned data volume p(t,x,y). Then, however, the instantaneous phase residues are computed directly from the data p(t,x,y) and q(t,x,y), as indicated above, by using $s_t(t,x,y)=N_t(t,x,y)/D(t,x,y)$, $s_x(t,x,y)=N_x(t,x,y)/D(t,x,y)$, and $s_y(t,x,y)=N_y(t,x,y)/D(t,x,y)$ where $$N_t=q^2(\partial_x q\cdot\partial_y p+\partial_y q\cdot\partial_x p-q\partial_{xy}p)-p^2(\partial_x q\cdot\partial_y p+\partial_y q\cdot\partial_x p+q\partial_{xy}p)+pq(2\partial_x p\cdot\partial_y p-2\partial_x q\cdot\partial_y q+q\cdot\partial_{xy}q)+p^3\partial_{xy}q$$

$$N_x=q^2(\partial_t q\cdot\partial_y p+\partial_y q\cdot\partial_t p-q\partial_{ty}p)-p^2(\partial_t q\cdot\partial_y p+\partial_y q\cdot\partial_t p+q\partial_{ty}p)+pq(2\partial_t p\cdot\partial_y p-2\partial_t q\cdot\partial_y q+q\cdot\partial_{ty}q)+p^3\partial_{ty}q$$

$$N_y=q^2(\partial_x q\cdot\partial_t p+\partial_t q\cdot\partial_x p-q\partial_{xt}p)-p^2(\partial_x q\cdot\partial_t q\cdot\partial_x p+q\partial_{xt}p)+pq(2\partial_x p\cdot\partial_t p-2\partial_x q\cdot\partial_t q+q\cdot\partial_{xt}q)+p^3\partial_{xt}q$$

$$D=(p^2+q^2)^2$$

Then, steps 104 and 105 are performed as in the method of FIG. 10.

At most locations (t,x,y), the wavelet-split attribute s(t,x,y) will be zero indicating the absence of phase residues. When computed in three dimensions, wavelet-split attributes based on instantaneous phase residues cannot exist in isolation (Huntley, 2001). If one views the square path enclosing an instantaneous phase residue as one face of a little cube, then at least one of the other five faces must also contain a phase residue. Most of the time, only two faces of a particular cube exhibit residues, although four or even all six faces of the cube might contain phase residues. Since a face with a phase residue belongs to two neighboring cubes, at least one additional face in each of these two cubes must also contain a phase residue and so on. Thus, once a wavelet split based on instantaneous phase residue has been detected, it can be traced from cube to cube forming a continuous path. The path either returns to its origin forming a closed loop or intersects the boundaries of the available data volume forming an open string. (FIG. 9) As stated previously, all wavelet-split attributes that belong to the same path can be gathered into one set defining an object or geobody. Each object is either a string or a loop, labeled with a unique index l, and consists of a set of points l(t,x,y). Such objects are what are generated in step 75 of FIG. 7. Thus, according to the present invention, any data volume of wavelet-split attributes can be used to identify potential geobodies in the subsurface region by the procedure of step 75.

In some embodiments of the invention, step 75 is performed using a connected component labeling algorithm which can collect the individual nonzero wavelet-split attributes into three dimensional objects by assigning unique labels to sets of connected nonzero values. (See Rosenfeld and Pfaltz, "Sequential operations in digital image processing," *Journal of the Association for Computing Machinery* 13, 471-494 (1966).)

At most locations (t,x,y), the wavelet-split attribute s(t,x,y) will be zero, and thus the total number of wavelet-split objects will be comparatively small. Nevertheless, the number of objects may render direct visualization and interpretation impractical. Each object may thus be classified in step 76 based on its properties and its relations to other objects and data. Based on this classification, an object may be either selected or suppressed.

The classification and selection of wavelet-split objects in step 76 may be implemented in different manners. Possible methods for classification include the object topology, size, or geometry. Classification may be based on secondary data such as seismic attributes at the point locations of the objects or the seismic attributes circumscribed by the objects. Objects may be classified by their relations to each other such as proximity or similarity. Possible methods for selection include user-based or range-based methods.

Figure 12:
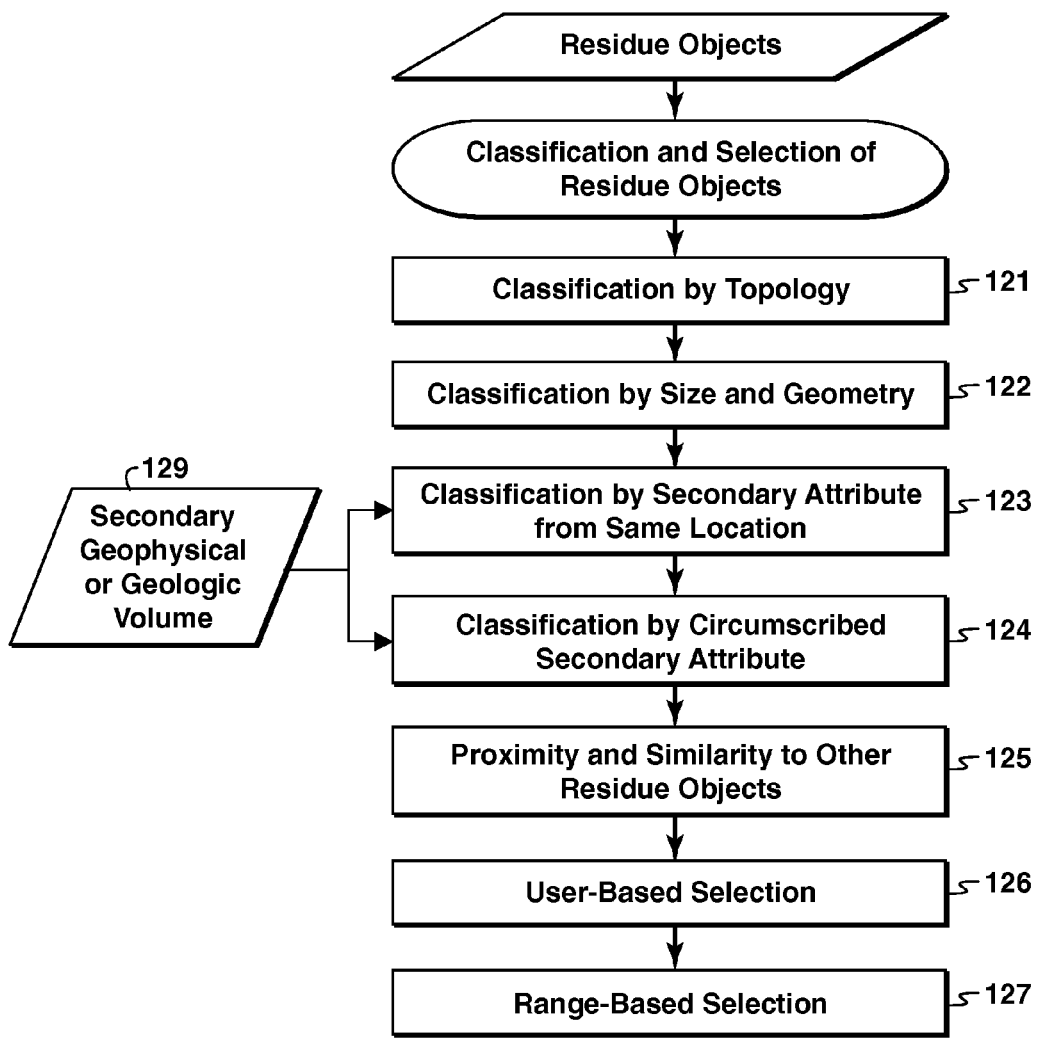
FIG. 12 is a flow chart listing possible criteria for the selection of wavelet split objects for further manipulation and interpretation.

The flow chart of FIG. 12 includes a few classification and selection options that may be particularly useful.

Figure 13:
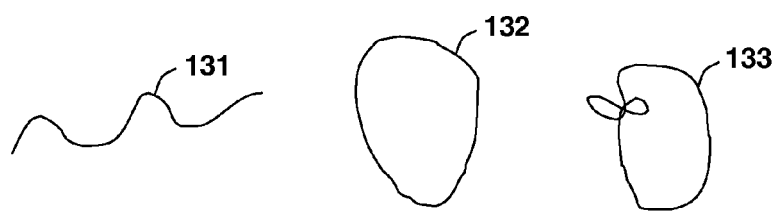
FIG. 13 illustrates possible object topologies: string, simple loop, and a more complicated loop with two bows.

A first classification step 121 is based on the object's topology, i.e., whether it is a string (131), a simple loop (132), or a more complicated shape with at least one bow (133; see FIG. 13).

A second step for classification 122 is based on object size and geometry. See Hu, "Visual pattern recognition by moment invariants," *IRE Transactions on Information Theory*, IT-8, 179-187 (1962). Size simply refers to the number of points constituting the object. Geometry refers to the location, orientation, and shape of the object. For a particular object with points l(t,x,y), these properties can be computed from the raw moments $M_{ijk}$ and the corresponding center of mass or centroid $(\bar{x},\bar{y},\bar{t})$.

$$M_{ijk}=\sum_x\sum_y\sum_t x^i y^j t^k$$

$$\bar{x}=M_{100}/M_{000}$$

$$\bar{y}=M_{010}/M_{000}$$

$$\bar{t}=M_{001}/M_{000}$$

The moment $M_{000}$ defines the object size. The raw moments and centroid allow definition of the central moments.

$$\mu_{ijk}=\sum_x\sum_y\sum_t(x-\bar{x})^i(y-\bar{y})^j(t-\bar{t})^k$$

Specifically, the first few moments are defined as:

$\mu_{000}=M_{000}$ $\mu_{100}=\mu_{010}=\mu_{001}=0$ $\mu_{110}=M_{110}-\bar{x}M_{010}=M_{110}-\bar{y}M_{100}$ $\mu_{101}=M_{101}-\bar{x}M_{001}=M_{101}-\bar{t}M_{100}$ $\mu_{011}=M_{011}-\bar{y}M_{001}=M_{011}-\bar{t}M_{010}$ $\mu_{200}=M_{200}-\bar{x}M_{100}$ $\mu_{020}=M_{020}-\bar{y}M_{010}$ $\mu_{002}=M_{002}-\bar{t}M_{001}$ These computations are analogous to the determination of the mass, center of gravity, the tensor of inertia and the corresponding moments of inertia for a piece of wire, which can be found in textbooks on classical mechanics. To first order, the geometry of object can then be summarized with the eigenvalues $\lambda_1 \geq \lambda_2 \geq \lambda_3$ and normalized eigenvectors $n_1$, $n_2$, $n_3$ of the moment (or covariance) tensor $$\begin{pmatrix} \mu_{200} & \mu_{110} & \mu_{101} \\ \mu_{110} & \mu_{020} & \mu_{011} \\ \mu_{101} & \mu_{011} & \mu_{002} \end{pmatrix} / M_{000}.$$

These eigenvalues correspond to the inertia moments of the objects, while the eigenvectors correspond to the principal axes of the inertia moments. A first filter is based on the object size $M_{000}$ where only objects with a size within a user-specified range are visualized or stored.

Moreover, an object is ball-like (spheroidal) for eigenvalues (or inertia moments) $\lambda_1 \approx \lambda_2 \approx \lambda_3$, donut-like (toroidal) for $\lambda_1 > \lambda_2 \approx \lambda_3$, or needle-like (prolate) for $\lambda_1 \approx \lambda_2 > \lambda_3$. Thus, the ratios $\lambda_2/\lambda_1, \lambda_3/\lambda_1, \lambda_3/\lambda_2$ allow classification of the individual objects by shape where only objects with ratios $\lambda_2/\lambda_1, \lambda_3/\lambda_1, \lambda_3/\lambda_2$ within user-specified ranges are visualized or stored. The eigenvectors (or principal orientations) $n_1, n_2, n_3$ for a particular object can be expressed by their azimuths $\phi_1, \phi_2, \phi_3$ and polar angles $\theta_1, \theta_2, \theta_3$. Thus, these orientations allow filtering of individual objects by only visualizing or storing objects with azimuths $\phi_1, \phi_2, \phi_3$ and polar angles $\theta_1, \theta_2, \theta_3$ within side user-specified ranges.

A third possible classification method (box 123) is based on the values at locations l(t,x,y) in a different seismic volume or geologic property model 129. An object is visualized or stored if the statistics of the values extracted from the other volume are within a user-defined range. These statistics include but are not limited to mean, extremes, or variability.

A fourth method for object classification (box 124) is based on the statistics of values of a seismic attribute or geologic model extracted from a different data volume 129 such as a box, a sphere, or an ellipsoid either contained within the object path l(t,x,y) or circumscribed by the object path l(t,x,y).

A fifth method for object classification (box 125) is based on the proximity and similarity of objects with regard to others.

A sixth possible step (box 126) is user-based selection of one or multiple objects where the user selects one or multiple objects in a manual and/or interactive manner.

A seventh possible step (box 127) is range-based selection where objects are selected based on one or multiple classifications falling within specified ranges or categories.

Moving to step 77 of FIG. 7, many surfaces with interest for geologic interpretation border or contain wavelet-split objects. Such surfaces include faults, the edges of reefs or salt domes, and stratigraphic unconformities or flooding surfaces. For a discussion of such surfaces, see Sheriff and Geldart, *Exploration Seismology*, 2$^{nd}$ ed., Cambridge University Press, pages 371-385, 401-412 (1995). Selected wavelet split objects are thus converted to surfaces, i.e. surfaces are constructed that encompass the objects. Specific methods for the conversion of residue objects to surfaces include interpolation, the construction of a minimal surface analogous to a soap film spanned by a wire frame (see for example Pinkall and Polthier "Computing Discrete Minimal Surfaces and Their Conjugates," *Experimental Mathematics* 2, 15-36 (1993)), extrapolation, or the tracking of secondary seismic attribute, for example by using the object's points as the seeds for an automatic picking algorithm applied to a seismic amplitude attribute (see, for example, U.S. Pat. No. 7,024,021).

In the description so far, all objects are constructed from the same seismic data volume. However, objects extracted from different volumes may be combined for further manipulation and interpretation. Wavelet-split attributes and wavelet-split objects may be simultaneously generated, classified, and selected for a number of different seismic data volumes. All the objects selected from the different data may then be combined for further manipulation and interpretation. The different data volumes may come from fundamentally different acquisition (e.g., multicomponents or shear wave) or processing (e.g., angle stacks or migration algorithm) methods. The different data volumes may also be generated by preconditioning a single volume in different ways. This preconditioning procedure could be bandpass filtering with overlapping and/or mutually exclusive pass bands, the application of a spectral decomposition algorithm (see, for example, Partyka et al., "Interpretational applications of spectral decomposition in reservoir characterization," *The Leading Edge* 18, 353-360 (1999)), structure oriented filters with different intensity, or other such techniques.

One example of using multiple volumes that are generated from a single parent volume is the construction of isopach maps, i.e., maps delineating the thickness of a rock layer. The location where the seismic wavelet splits in a pinch-out or wedge situation depends on the frequency of the seismic wavelet. The object generated on the high-frequency volume will be closer to the hinge line than the object from the low-frequency volume. If the dominant frequency of the wavelet is known, and if an estimate of the seismic velocity is available, and thus, if the dominant wavelength can be computed from this frequency, then the object can be treated as a contour line for the reflector separation for a value of half this wavelength. By computing the objects from a number of seismic volumes with different dominant frequencies, one can thus construct a set of contour lines for reflector separations.

With the description above, the present invention thus may be distinguished from known methods involving some similar concepts. For example, comparing the invention to the disclosures in U.S. Pat. No. 5,724,309 to Higgs and Luo:

1) Higgs and Luo do not disclose or use a phase residue volume to define their objects.
2) They neither compute the cross derivatives nor do they correct for the ambiguity in instantaneous phase.
3) Their results are continuous volume attributes while the present invention generates a discrete attribute with parsimonious support
4) The present invention converts the attribute into discrete objects, which allows further manipulation and interpretation.

Among other differences already noted: Ghiglia and Pritt disclose no other use for phase residues except phase unwrapping; and Huntley does not disclose or suggest using the objects his method produces to interpret stratigraphy and structure of the subsurface region, for evaluation of its hydrocarbon potential, or for quality control on seismic acquisition and processing. Taner discloses an instantaneous phase attribute, but this is quite different from the instantaneous phase residue attribute of the present invention, i.e. the embodiment of the invention in which the wavelet-split attribute is computed using complex trace analysis. The instantaneous phase residue resembles the curl of the gradient of the instantaneous phase, i.e., there are two additional spatial derivatives which allow finding the locations where the instantaneous phases are spatially inconsistent due the sudden existence of too much phase. These locations are the wavelet splits where an additional wiggle and thus additional phase appears.

EXAMPLE

Figure 1:
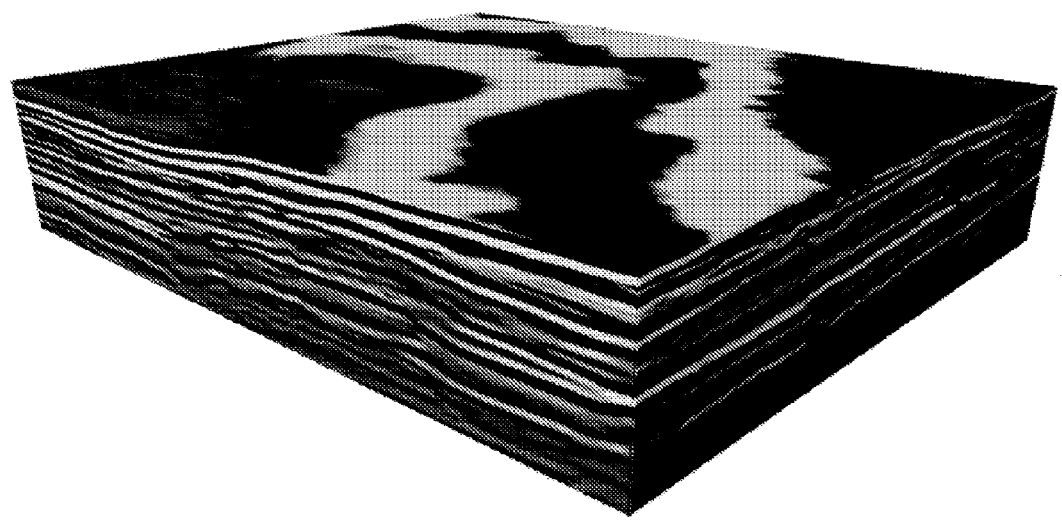
FIG. 1 shows a fully processed seismic data volume representing the structures and geometries of the subsurface.
Figure 14:
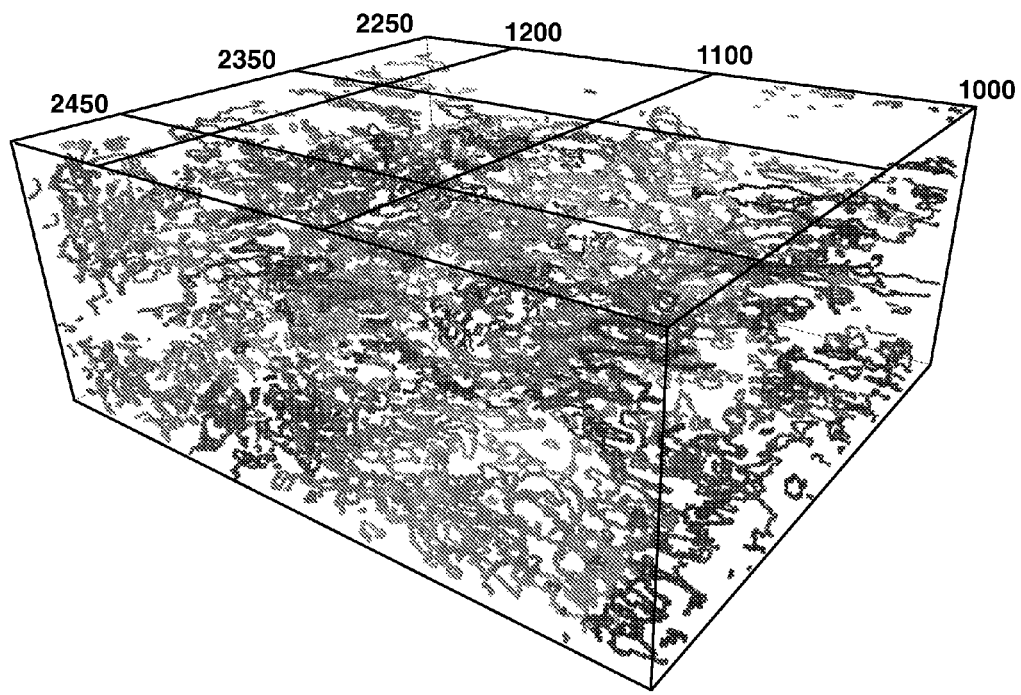
FIG. 14 illustrates wavelet split objects generated by the present inventive method by labeling the connected wavelet split attribute shown in FIG. 4.
Figure 15:
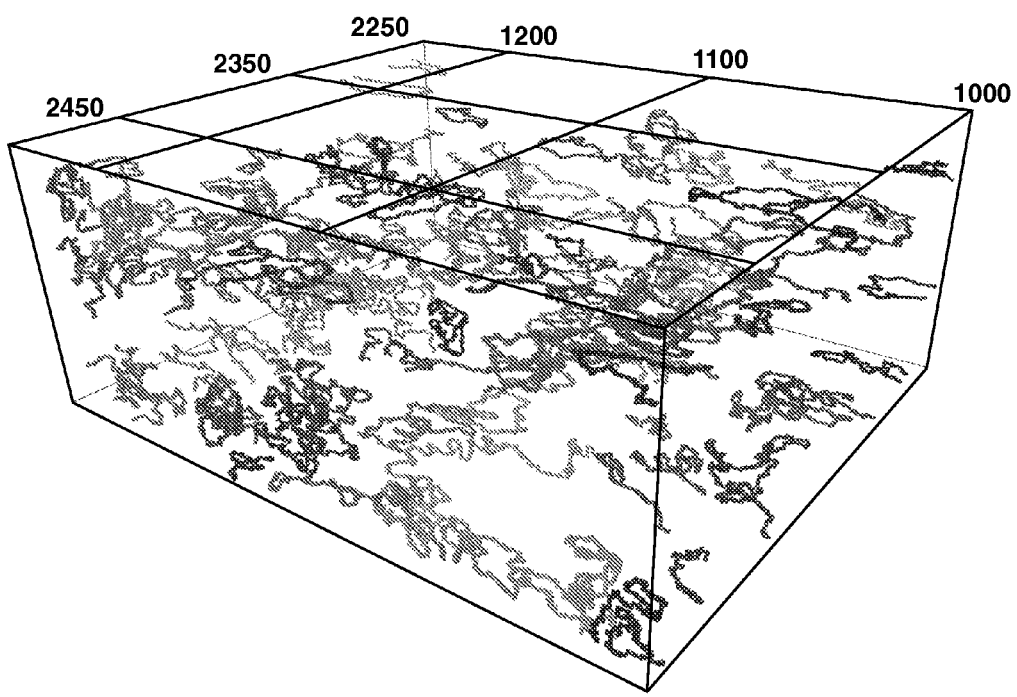
FIG. 15 shows wavelet split objects remaining after selection of mid-sized objects only in the example of FIG. 14.

The example is for a seismic data volume with a size of 501 by 501 by 149 samples. This volume is shown in FIG. 1. Following the method of FIG. 7, the volume was converted to the wavelet-split attribute volume shown in FIG. 4 by applying complex trace analysis to compute the instantaneous phase (step 102 in FIG. 10.) followed by computation of instantaneous phase residues (steps 102 and 103). The resulting wavelet-split attributes where then converted to wavelet-split objects shown in FIG. 14 by connected component labeling (step 75). A first classification and selection (step 76) was based on object size. Small loops often correspond to noise. Huge loops often relate to seismic processing artifacts or large-scale structural features. FIG. 15 presents the objects remaining after removal of both tiny and huge objects.

First, the seismic amplitude volume was converted to a seismic instantaneous phase volume (step 102 in FIG. 10). Second, the phase residues were computed (step 103) using complex trace analysis and the definition of instantaneous phase as arctan q/p. Then, the residues were converted to loop and string objects (step 75) by tracing a phase residue from cube to cube in the residue attribute data volume.

TABLE 1

Geometrical parameters computed for some objects. Label 0 denotes the background, i.e., locations without wavelet splits.

| label | size | $\bar{x}$ | $\bar{y}$ | $\bar{z}$ | $\lambda_3/\lambda_1$ | $\lambda_2/\lambda_1$ | $\lambda_3/\lambda_2$ | $\theta_1$ | $\phi_1$ |
|---|---|---|---|---|---|---|---|---|---|
| 0 | 9312885 | 74 | 125 | 125 | 0.68 | 0.68 | 1.00 | 0.00064 | −1.81910 |
| 14345 | 2237 | 37 | 185 | 156 | 0.17 | 0.87 | 0.19 | 0.10321 | −2.94940 |
| 5604 | 1808 | 136 | 207 | 70 | 0.19 | 0.86 | 0.22 | 0.19181 | 3.06070 |
| 11424 | 1603 | 126 | 153 | 178 | 0.31 | 0.78 | 0.39 | 0.41445 | −1.89120 |

Table 1 presents geometric quantities computed for a three select objects. The quantities include size, location of the centroid, the ratios of the eigenvalues or inertia moments which quantify shape, and object orientation. Table 1 is an example of the size and geometry characteristics that can be used to classify wavelet-split objects (step 76).

Figure 16:
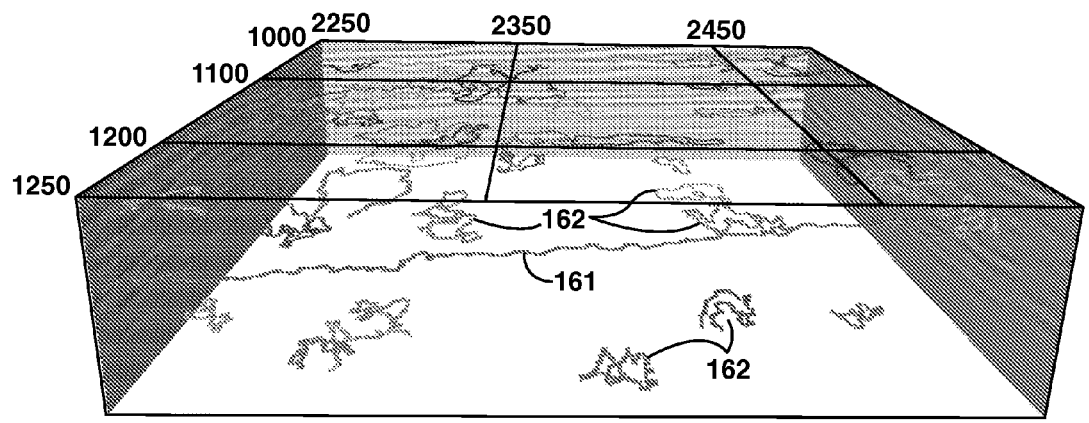
FIG. 16 shows wavelet split objects remaining in the example of FIG. 14 after filtering by size and polar angle, the objects corresponding to stratigraphic pinch outs.
Figure 17:
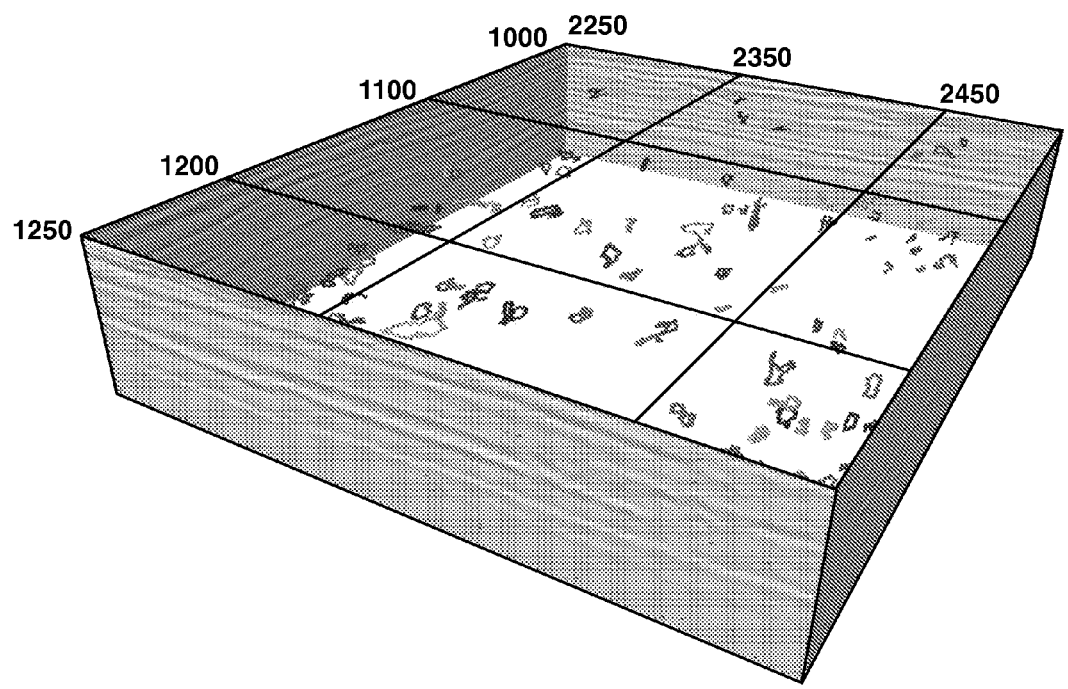
FIG. 17 shows the wavelet split objects of FIG. 16 after removal of flat lying ones.

FIG. 16 presents only the flat lying objects (selection of objects, step 76). The flat lying objects correspond to pinch outs while the near-vertical ones are more indicative of seismic data processing artifacts. Note for example the long string 161 caused by a wedge or the neighboring loops 162 caused by the splitting and merging of a reflector corresponding to a flooding surface. In FIG. 17, the flat lying objects have been removed (more selection, step 76). The remaining steeply dipping features correspond to seismic migration artifacts or static busts.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting wavelet-split objects and/or objects or surfaces may either be downloaded or saved to computer storage.

The invention claimed is:

1. A method for geophysical or stratigraphic interpretation of a subsurface region, comprising:
   (a) obtaining a volume of seismic data representative of the subsurface region, said seismic data comprising traces having amplitude and phase as a function of recording time;
   (b) computing a data volume of values of a wavelet-split attribute from the seismic data volume, a data volume being a discrete set of data samples wherein the subsurface region is subdivided into discrete cells, each cell having a single value of a data parameter, wherein a wavelet-split attribute is any seismic data attribute that indicates data volume cells where one seismic waveform is about to split into two separately distinguishable ones;
   (c) generating one or more objects (geobodies) from the wavelet-split attribute data volume; and
   (d) using the one or more objects to interpret structure or stratigraphy of the subsurface region or for quality control on seismic acquisition and processing.

2. The method of claim 1, further comprising using interpreted structure or stratigraphy of the subsurface region or quality-controlled seismic acquisition and processing to prospect for hydrocarbon accumulations.

3. The method of claim 1, wherein the one or more objects are connected strings or loops of non-zero values of the wavelet split attribute.

4. The method of claim 1, further comprising constructing surfaces from the objects.

5. The method of claim 4, wherein the surfaces are constructed from a spine and a rim, wherein the spine is associated with a wavelet split string or loop or part thereof and the rim is associated with a second seismic attribute.

6. The method of claim 5, wherein said second seismic attribute is related to the wavelet split attribute.

7. The method of claim 6, wherein the related second attribute is an object grown by a seed picking algorithm using points from the one or more objects from the wavelet-split attribute data as seed points.

8. The method of claim 1, wherein the wavelet-split attribute values are instantaneous phase residues computed using complex trace analysis.

9. The method of claim 8, further comprising creating an instantaneous phase data volume from the seismic data volume and examining closed paths in the instantaneous phase data volume wherein phase differences between adjacent data samples are added up for a full traverse of a closed path, with phase differences falling outside a range $-\pi$ to $\pi$ being brought back into said range by adding or subtracting an integer multiple of $2\pi$, and the wavelet-split attribute data volume is constructed showing cells in the data volume having non-zero phase residues.

10. The method of claim 8, wherein a quadrature data volume is created from the seismic data volume, and instantaneous phase is computed from arctan q/p where p and q are seismic amplitudes at a given location in the seismic data volume and its quadrature volume, respectively.

11. The method of claim 8, wherein a quadrature data volume is used to compute instantaneous phase, said quadrature data volume being created by applying a Hilbert transformation to the seismic data volume.

12. The method of claim 8, wherein the wavelet split attribute comprises any linear combination of one or more of the instantaneous phase residues, or their absolute values, computed from each of three orthogonal directions.

13. The method of claim 12, wherein the three orthogonal directions are (x,y,t) where seismic data recording time t represents the vertical direction, and the instantaneous phase residue in the vertical direction $s_t(t,x,y)$ is computed from $$s_t(t,x,y)=\partial_{xy} \arctan(q(t,x,y)/p(t,x,y))$$

where p and q are seismic amplitudes at a given location (t, x, y) in the seismic data volume and its quadrature volume, respectively, and the instantaneous phase residues in the horizontal directions, $s_x$ and $s_y$, are given by $$s_x(t,x,y)=\partial_{ty} \arctan(q(t,x,y)/p(t,x,y)) \text{ and}$$

$$s_y(t,x,y)=\partial_{tx} \arctan(q(t,x,y)/p(t,x,y)).$$

14. The method of claim 8, wherein the attribute's value at any given location in the attribute data volume consists of a sum of the instantaneous phase residues, or their absolute values, computed from each of three orthogonal directions at the given location, plus a sum of the instantaneous phase residues, or their absolute values, computed from each of three orthogonal directions at one or more neighboring locations of the given location.

15. The method of claim 1, wherein locations of wavelet splits are determined by comparing neighboring seismic data traces looking for a wavelet shape inflection to develop, then disappear, and the wavelet-split attribute volume is constructed showing cells in the data volume exhibiting an inflection in wavelet shape.

16. The method of claim 1, further comprising computing a data volume of instantaneous phase from the seismic data volume, and computing the wavelet-split attribute data volume from the data volume of instantaneous phase.

17. The method of claim 1, wherein the one or more objects (geobodies) are generated from the wavelet-split attribute data volume using a connected component labeling algorithm which collects individual wavelet splits into three dimensional objects by assigning unique labels to sets of connected locations exhibiting wavelet splits.

18. The method of claim 1, wherein the objects generated in step (c) are reduced in number by classification and selection.

19. The method of claim 18, wherein the classification and selection is based on object topology, size, geometry or a second attribute.

20. The method of claim 1, wherein the wavelet-split attribute measures whether a count of seismic cycles is consistent along a closed path.

21. A method for producing hydrocarbons from a subsurface region, comprising:
  (a) obtaining a 3D seismic survey of the subsurface region;
  (b) obtaining an interpretation of the structure of the subsurface region made by a method as described in claim 1;
  (c) using the interpreted structure of the subsurface region to prospect for hydrocarbon accumulations in the subsurface region; and
  (d) in response to identifying such an accumulation of hydrocarbons, drilling a well and producing hydrocarbons from the subsurface region.

* * * * *